US006183639B1

(12) United States Patent
de Winter

(10) Patent No.: US 6,183,639 B1
(45) Date of Patent: Feb. 6, 2001

(54) HOLLOW FIBER FILTER MODULE AND METHOD OF MANUFACTURING SAME

(75) Inventor: Dirk de Winter, Vista, CA (US)

(73) Assignee: Hydranautics, Oceanside, CA (US)

( * ) Notice: Under 35 U.S.C. 154(b), the term of this patent shall be extended for 0 days.

(21) Appl. No.: 09/407,321

(22) Filed: Sep. 28, 1999

(51) Int. Cl.[7] ................................................ B01D 69/08
(52) U.S. Cl. ................. 210/321.8; 210/321.79; 210/321.88; 210/321.89; 210/435; 210/500.23
(58) Field of Search .................. 210/321.78, 321.79, 210/321.8, 321.81, 321.87, 321.88, 321.89, 321.9, 435, 437, 500.23; 29/419.1, 453

(56) References Cited

U.S. PATENT DOCUMENTS

| | | |
|---|---|---|
| 3,228,876 | 1/1966 | Mahon . |
| 3,504,796 | 4/1970 | Bray ....................................... 210/137 |
| 4,352,736 | 10/1982 | Ukai et al. .......................... 210/497.1 |
| 4,358,377 | 11/1982 | Clark .................................. 210/323.2 |
| 4,430,219 | 2/1984 | Kuzumoto et al. ................ 210/500.2 |
| 4,690,760 | 9/1987 | Smoot et al. ...................... 210/433.2 |
| 4,707,267 | 11/1987 | Johnson .............................. 210/650 |
| 4,715,955 | 12/1987 | Friedman ............................. 210/346 |
| 4,752,305 | 6/1988 | Johnson .......................... 210/321.89 |
| 4,781,834 | 11/1988 | Sekino et al. ................... 210/321.88 |
| 4,863,600 | 9/1989 | Leonard et al. ................. 210/321.89 |
| 4,997,564 | 3/1991 | Herczeg .......................... 210/321.61 |
| 5,198,110 | 3/1993 | Hanai et al. .................... 210/321.79 |
| 5,261,981 | 11/1993 | Schneider et al. .............. 210/321.89 |
| 5,282,964 | 2/1994 | Young et al. ................... 210/321.89 |
| 5,352,361 | 10/1994 | Prasad et al. ................... 210/321.81 |
| 5,450,516 | 9/1995 | Pasquali et al. ...................... 385/115 |
| 5,538,642 | 7/1996 | Solie .................................... 210/652 |
| 5,747,138 | 5/1998 | Leonard .............................. 428/113 |

*Primary Examiner*—John Kim
(74) *Attorney, Agent, or Firm*—Akin, Gump, Strauss, Hauer & Feld, L.L.P.

(57) ABSTRACT

A filter module for filtering raw liquid that includes an outer housing having a longitudinal axis and raw liquid inlet and outlet ends. A non-porous member is attached to each end of the outer housing to form a seal between a hollow tube and the outer housing. A plurality of fins are disposed among hollow fiber filter elements to separate the elements into a plurality of bundles. Each of the fins has a plurality of spacers abutting the hollow tube to form liquid pathways between each of the respective fins in the hollow tube. The spacing of the fibers in the bundles of the filter module may be increased by twisting a bundle in a first direction about a longitudinal axis to stretch the fibers, sliding a plurality of sleeved segments over the twisted bundle to fix the position of portions of the fibers at predetermined points along the length of the bundle, and untwisting the bundle to generate a plurality of outward bows of the fibers from the longitudinal axis of the bundle, thus creating spaces between the fibers in the bundles. The module may also include a first plurality of nettings each enclosing a separate one of the plurality of bundles and a second plurality of nettings each positioned over one of the first plurality of nettings and having a coarser texture than the first plurality of nettings.

3 Claims, 5 Drawing Sheets

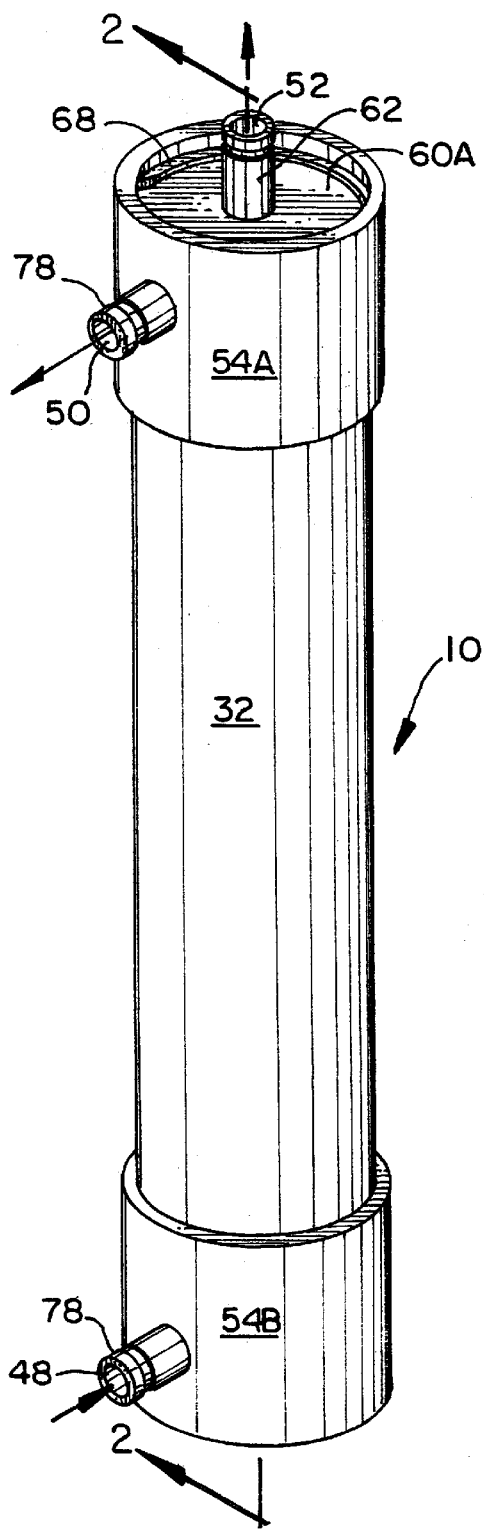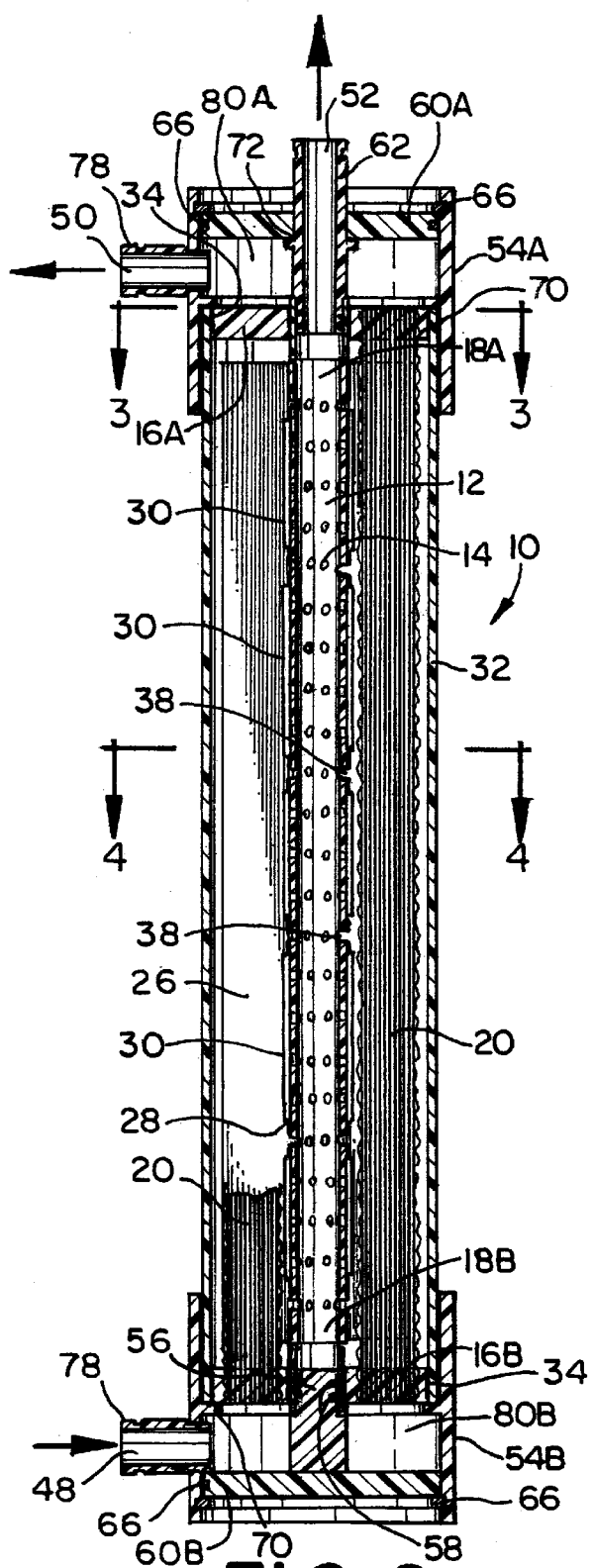
FIG. 1
FIG. 2

HOLLOW FIBER FILTER MODULE AND METHOD OF MANUFACTURING SAME

BACKGROUND OF THE INVENTION

The present invention relates to a membrane separation apparatus and, more specifically, relates to an improved filter module of the hollow fiber type, and a method of manufacturing such a module.

The membrane separation process is an operation that separates one or more components from a liquid comprising those components (and possibly other components) by the use of a membrane having a selective permeability to the liquid. Thus, depending on the permeability of the membrane, certain components can be filtered from the liquid while other components remain.

Despite many developments and improvements in hollow fiber filtration modules, the challenge to optimize the operability, efficiency, and durability of the modules continues. The hollow fibers of a conventional membrane separation apparatus are arranged tightly and uniformly around a hollow perforated pipe so that liquid is filtered through the hollow fibers and then collected and removed from the filter module by the hollow perforated pipe. Unfortunately, however, filtered liquid often does not flow efficiently from the individual fiber elements to the hollow tube, due to the dense packing of the fibers within a typical filter module. The impeded flow of the filtered liquid results in the filtered liquid flowing at a reduced rate of speed and, accordingly, increases the pressure differential required to operate the filter module at a given volume.

SUMMARY OF THE INVENTION

Briefly stated, the present invention is directed to a filter module for filtering raw liquid that includes an outer housing having a longitudinal axis and raw liquid inlet and outlet ends. A hollow tube is located generally along the longitudinal axis of the outer housing and has a plurality of perforations for guiding filtered liquid from the module. A non-porous member is attached to each end of the outer housing to form a seal between the hollow tube and the outer housing. A plurality of hollow fiber filter elements are arranged in an annular space that is formed between the hollow tube and the outer housing, the plurality of fibers are secured by and penetrate through the non-porous member at each end to form channels for the raw liquid through the module. The plurality of hollow fiber filter elements are adapted to filter raw liquid by selectively passing liquid through their circumferential walls. A plurality of fins are disposed among the hollow fiber filter elements to separate the elements into a plurality of bundles. The fins extend radially outward from the hollow tube toward the outer housing. Each of the fins has a plurality of spaces abutting the hollow tube to form liquid pathways between each of the respective fins and the hollow tube.

The present invention is also directed to a method of manufacturing a filter module of the type in which a plurality of hollow fibers are arranged in a plurality of bundles that are secured in an outer housing for filtering raw liquid through a circumferential surface of the plurality of fibers and an interior hollow perforated tube is provided for guiding filtered liquid out of the module. According to the manufacturing method, the lateral spacing of the fibers in the bundles is increased by: securing a first end of a fiber bundle having a longitudinal axis; securing a second end of the bundle; rotating the second end of the bundle in a first direction about the longitudinal axis to twist the bundle and stretch the fibers; sliding a plurality of sleeve segments over the twisted bundle to fix the position of portions of the fibers at predetermined points along the length of the bundle; rotating the second end of the bundle in a second direction, opposite in direction to the first direction, to generate a plurality of outward bows of the fibers from the longitudinal axis of the bundle, thus creating spaces between the fibers in the bundle; and installing the bundle within the outer housing.

The present invention is also directed to a filter module for filtering raw liquid which includes an outer housing having a longitudinal axis and raw inlet and outlet ends. A hollow tube is located generally along the longitudinal axis of the outer housing and has a plurality of perforations for guiding filtered liquid from the module. A non-porous member is attached to each end of the outer housing to form a seal between the hollow tube and the outer housing. A plurality of hollow fiber filter elements are arranged in an annular space formed between the hollow tube and the outer housing. The plurality of fibers are secured by and penetrate through the nonporous members to form channels for the raw liquid through the module. The plurality of hollow fiber filter elements are adapted to filter raw liquid by selectively passing raw liquid through their circumferential walls. A plurality of fins are disposed among the hollow fiber filter elements to separate the elements into the plurality of bundles. A first plurality of nettings each enclose a separate one of the plurality of bundles and a second plurality of nettings are each positioned over one of the first plurality of nettings and have a coarser texture than the first plurality of nettings.

BRIEF DESCRIPTION OF THE DRAWINGS

The foregoing summary, as well as the following detailed description of the invention will be better understood when read in conjunction with the appended drawings. For the purpose of illustrating the invention, there are shown in the drawings embodiments which are presently preferred. It is understood, however, that the present invention is not limited to the precise arrangements and instrumentalities shown. In the drawings:

FIG. 1 is a perspective view of a filter module according to the present invention;

FIG. 2 is an elevational cross-sectional view of the filter module of FIG. 1 taken along the line 2—2 of FIG. 1;

DETAILED DESCRIPTION OF THE INVENTION

Figure 3:
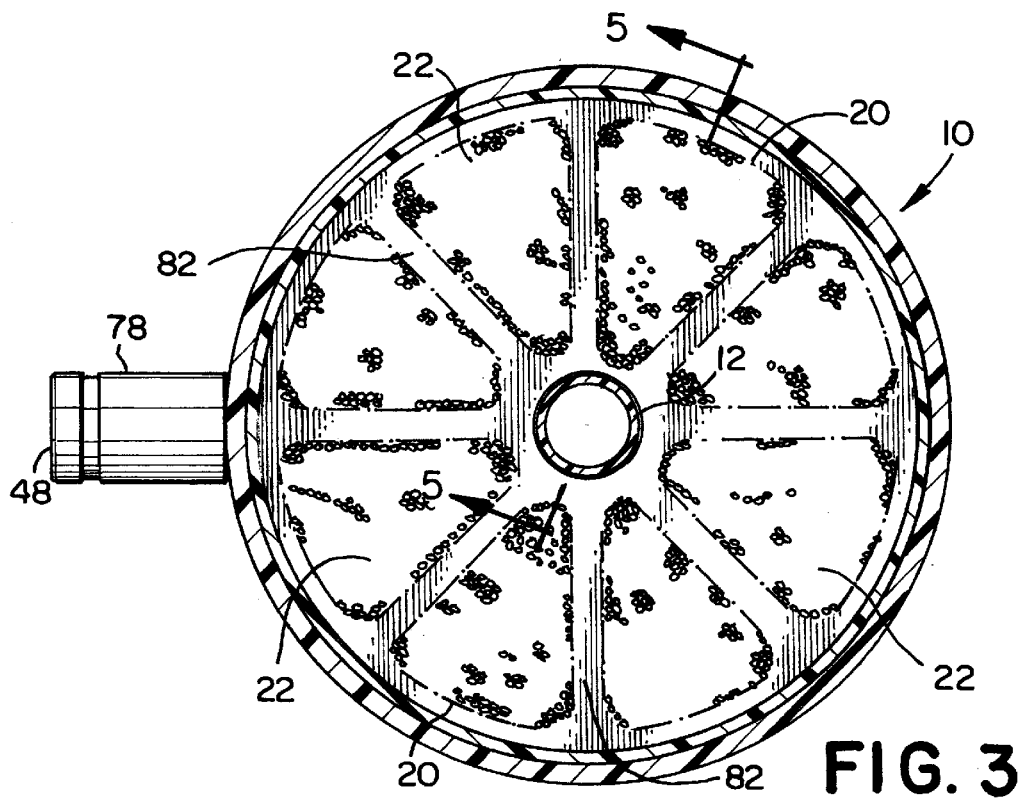
FIG. 3 is a planar cross-sectional view of the filter module of FIG. 2 taken along the line of 3—3 of FIG. 2.

Certain terminology is used in the following description for convenience only, and is not limiting. The words "right," "left," "lower," and "upper" designate directions in the drawings to which reference is made. The words "inwardly" and "outwardly" refer to directions toward and away from, respectively, the geometric center of the filter module and designated parts thereof. The terminology includes the words above specifically mentioned, derivatives thereof, and words of similar import. Additionally, the word "a" as used in the claims means "at least one." Furthermore, the word "liquid" as used in the specification and the claims means "liquids and/or gases."

Figure 5:
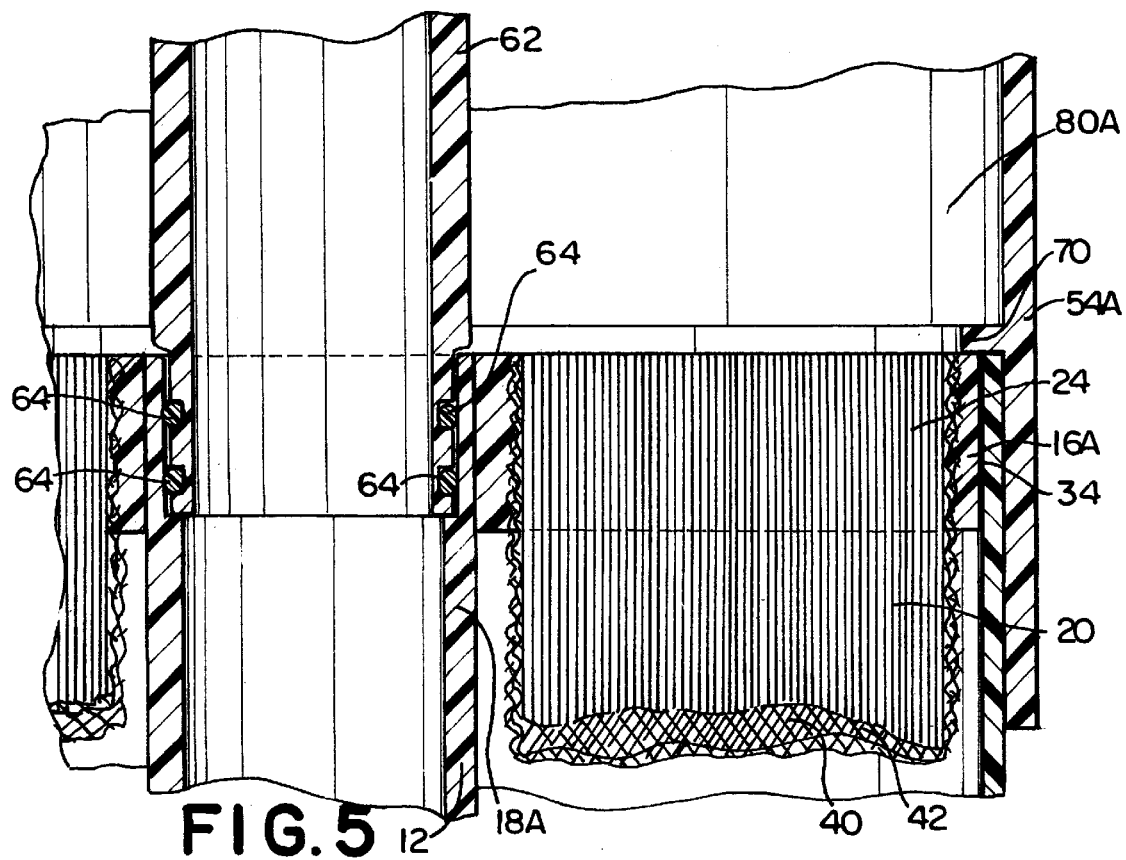
FIG. 5 is a partial elevational cross-sectional view of the filter module of FIG. 3 taken along the line 5—5 of FIG. 3.
Figure 6:
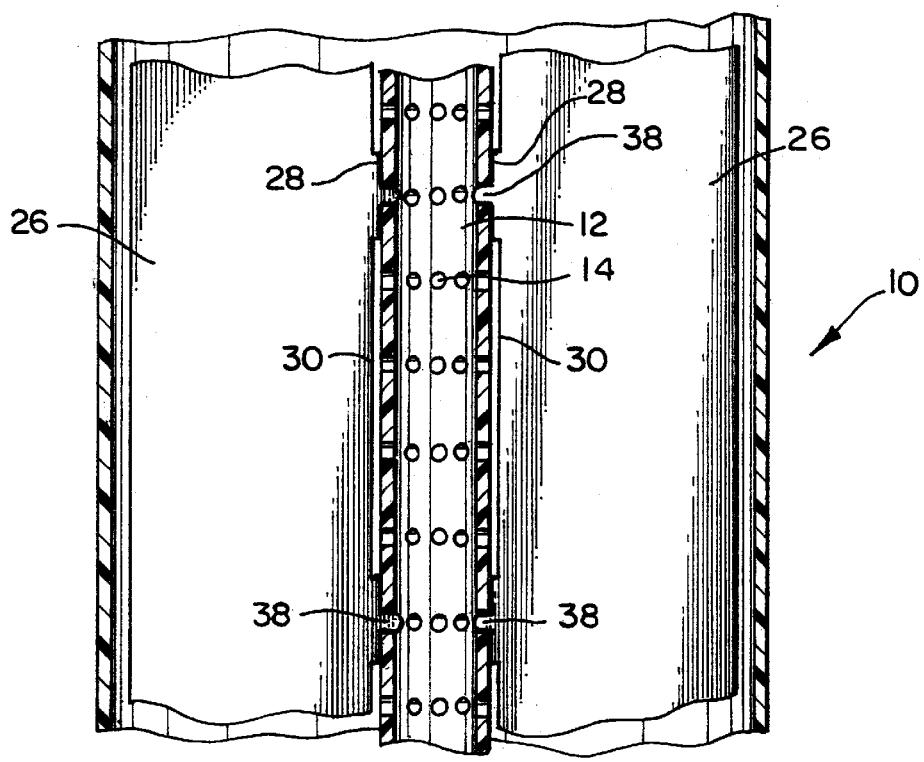
FIG. 6 is a partial elevational cross-sectional view of the filter module of FIG. 4 taken along the line 6—6 of FIG. 4.
Figure 7:
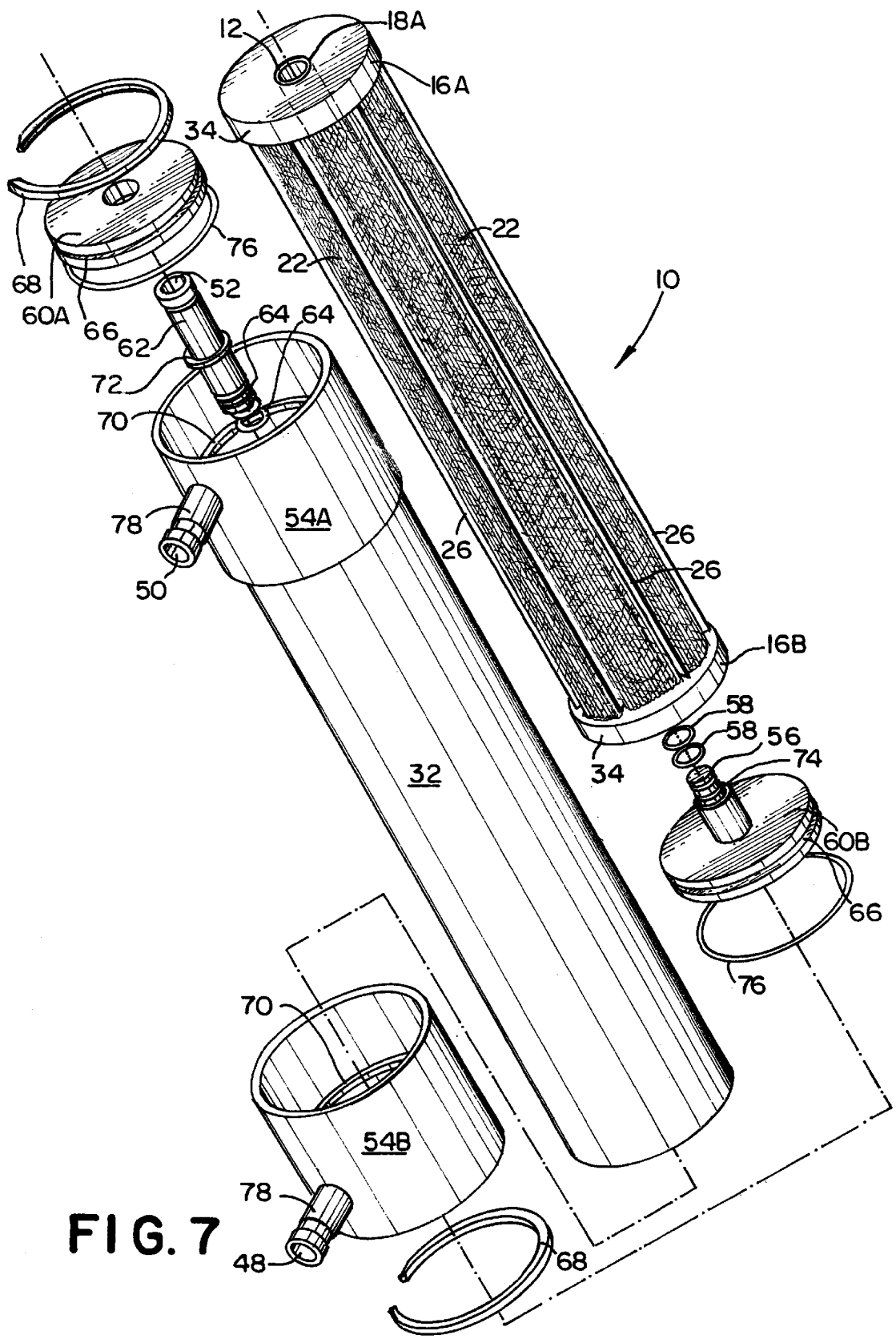
FIG. 7 is an exploded perspective view of the filter module of FIG. 1.
Figure 8:
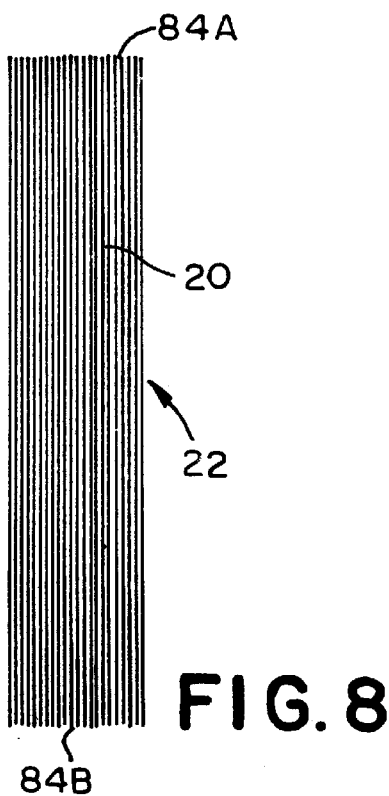
FIG. 8 is an elevational view of a plurality of fibers gathered to form a bundle.

Referring to FIGS. 1–11, wherein like numerals designate like elements throughout, there is shown a preferred embodiment of a method for manufacturing a filter module according to the present invention and a preferred embodiment of a filter module constructed according to the present invention, generally designated 10. Generally speaking, the filter module 10 filters raw liquid that enters the outer housing 32 of the filter module 10 via a raw liquid inlet end 48, as shown in FIGS. 2 and 7. The liquid enters through a sideport adapter 78 that forms the raw liquid inlet end 48 and is guided through a plurality of hollow fiber filter elements 20. While the raw liquid is transported through the fibers 20, raw liquid permeates through the walls of the fibers and is filtered by the material of the fibers 20. The filtered liquid then flows toward a hollow tube 12 that transports the filtered liquid out of the filter module 10 via a filtered liquid outlet 52 that is formed by a product end adapter 62. The raw liquid and remaining impurities that are in the fibers 20 are transported through the fibers 20 and out of the filter module 10 through the raw liquid outlet end 50 that is formed by a sideport adapter 78. Thus, the filter module 10 removes filtered liquid from a raw liquid stream by filtering the raw liquid through fibers 20.

Referring to FIGS. 1–7, the filter module 10 includes an outer housing 32 having a longitudinal axis and raw liquid inlet and outlet ends 48, 50. The hollow tube 12 is enclosed in the outer housing 32 and is located generally along the longitudinal axis of the outer housing 32. The hollow tube 12 has a plurality of perforations for guiding filtered liquid from the module 10. Referring to FIG. 7, the outer housing 32 includes first and second headers 54A, 54B, first and second end pieces 60A, 60B, sideport adaptors 78, a product end adaptor 62, and retaining clips 68. Unless otherwise specified, the outer housing 32 and the above-mentioned components are formed of a suitably strong, non-corrosive, and anti-reactive material such as polyvinyl chloride. However, those of skill in the art, will appreciate from this disclosure that various materials can be used to form the outer housing 32 and associated components including steel, plastics, alloys, and multi-layered materials such as laminates, depending on the particular liquid being filtered by the filter module 10 and the environment in which the filter module 10 is operated.

The hollow tube 12 is preferably formed of a polyvinyl chloride material. However, those of skill in the art will appreciate from this disclosure that the hollow tube 12 may be formed using polyethylene or any material having suitable anti-corrosion properties and strength. Those of skill in the art will appreciate from this disclosure that the size of the hollow tube 12 can be varied depending upon the size and application for which the filter module 10 is designed.

Referring to FIGS. 2, 5, and 7, a non-porous member 16A, 16B is attached to each end of the outer housing 32 to form a seal between the hollow tube 12 and the outer housing 32. The first and second non-porous members 16A, 16B, are preferably formed using an epoxy. However, those of skill in the ar will appreciate from this disclosure that the first and second non-porous layers 116A, 116B, may be formed using any resin-like material having suitable anti-corrosion and anti-wear properties.

A plurality of hollow fiber filter elements 20 are arranged in an annular space formed between the hollow tube 12 and the outer housing 32. The plurality of fibers are secured by and penetrate through the non-porous members 116A, 116B at each end to form channels for the raw liquid through the module 10. The hollow fibers 20 used in filter modules of the present invention are generally formed from a microporous polymer which is capable of separating one or more components from one or more liquids in a liquid mixture. It is preferred to use fibers 20 formed using polyethersulfone according to the method of U.S. Pat. No. 4,051,300 which is hereby incorporated by reference in its entirety. However, those of skill in the art will appreciate that the particular polymer used to form the fibers 20 can be varied depending on the application for which the filter module is intended without departing from the scope of the present invention.

Figure 9:
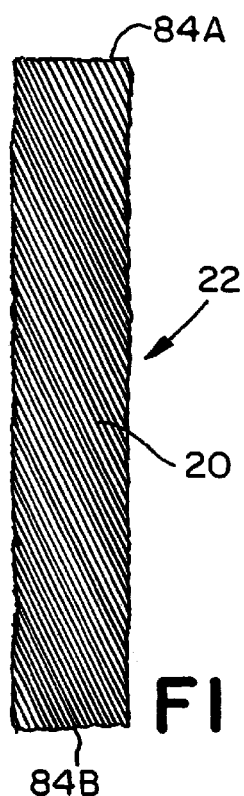
FIG. 9 is an elevational view of the bundle of FIG. 8 after being twisted in a first direction about a longitudinal axis of the bundle to stretch the fibers.
Figure 10:
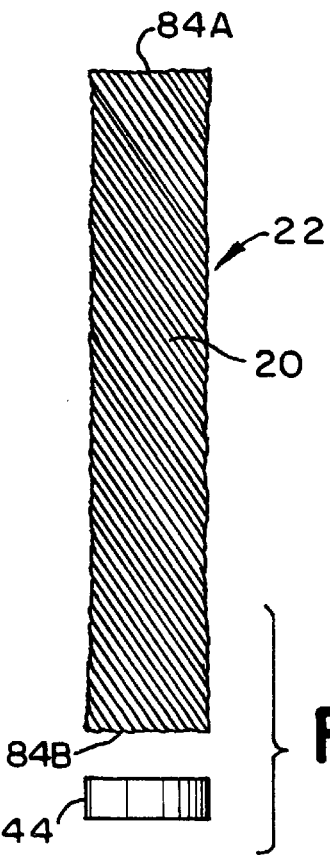
FIG. 10 is an elevational view of a sleeve section aligned with one end of the twisted bundle of FIG. 9 in preparation for the positioning of the sleeve section over the twisted bundle.
Figure 11:
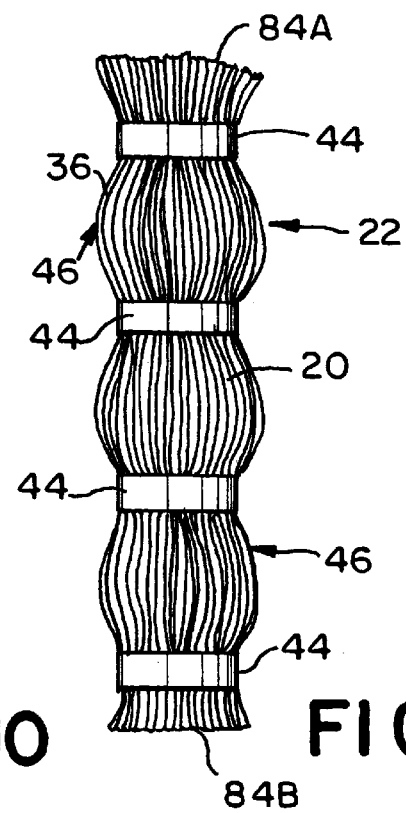
FIG. 11 is an elevational view of the twisted bundle of FIG. 9 after multiple sleeve sections have been placed thereon and the bundle has thereafter been untwisted causing the fibers to bow outward from the longitudinal axis.

Referring to FIGS. 2, 7, and 8–11, the fibers 20 generally extend from the outward facing surface of the first non-porous layer 116A to the outward facing surface of the second non-porous layer 16B. The plurality of hollow fiber filter elements 20 are adapted to filter raw liquid by selectively passing liquid through their circumferential walls. While the fibers 20 are shown in FIGS. 2, 5, and 7 as being generally linear in shape, one embodiment of the present invention specifically includes fibers 20 having a bowed shape 46 as shown in FIG. 11 and discussed in further detail below. Referring to FIGS. 3, 4, 7, and 8–11, individual groupings of fibers 20 are gathered to form bundles 22.

The bundles 22 are preferably formed using between approximately 1,000 and approximately 1,500 fibers. However, those of skill in the art will appreciate from this disclosure that any number of fibers 20 can be accommodated in each individual bundle 22 depending only on the size of the filter module 10, and the relative size of an individual fiber 20.

Figure 4:
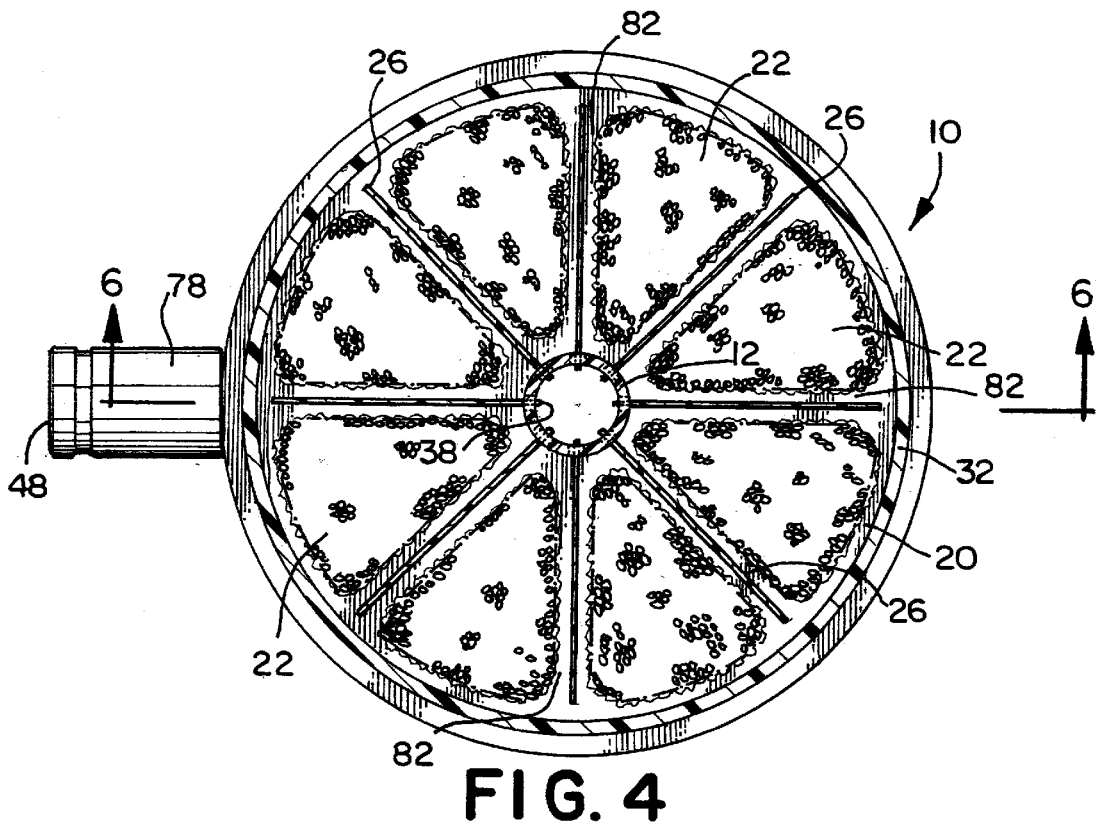
FIG. 4 is a planar cross-sectional view of the filter module of FIG. 2 taken along the line 4—4 of FIG. 2.

As shown in FIGS. 3 and 4, eight bundles 22 are positioned generally symmetrically around the centrally located hollow tube 12. While the preferred embodiment of the filter module 10 has eight bundles, those of skill in the art will appreciate from this disclosure that the number of bundles surrounding the hollow tube 12 may be varied, e.g., three to thirty bundles 22 may be used without departing from the scope of the present invention. Bundles 22, when viewed in cross-section, each occupy the area of an arc of a circle and preferably have a wedge-shape.

Referring to FIGS. 3 and 4, a gap 82, or space, exists between each of the bundles 22. The gap 82 facilitates the transfer of filtered water that has passed through the microporous material of the fibers 20 and simplifies the transfer of the filtered water to the hollow tube 12.

A first plurality of nettings 40 each enclose a separate one of the bundles 22, as shown in FIGS. 5 and 7. The nettings 40 are preferably formed by a polyethylene material. Each netting 40 extends substantially along the entire length of a bundle 22 so as to extend approximately from the inner surface of the first non-porous layer 16A to the inner surface of the second non-porous layer 16B.

A second plurality of nettings 42 are each positioned over one of the first nettings 40. The second nettings 42 preferably have a coarser texture than the first nettings 40. Using a double netting to contain each bundle 22 results in superior performance of the filter module 10 by decreasing the amount of fiber 20 breakage that occurs. The relatively finer texture of the first nettings, which enclose the bundles 22, abrades the fibers 20 to a lesser extent than would the relatively more coarse second netting 42. However, the relatively more coarse second netting 42 provides a stronger layer of protection between the bundle 22 and the remaining components of the filter module 10 than would the relatively less coarse first netting 40. While it is preferable that each of the bundles 22 have both a first and second netting 40, 42 placed thereover, those of skill in the art will appreciate from this disclosure that other combinations of netting can be used, such as using only a single netting or using four nettings, without departing from the scope of the present invention.

Each of the bundles 22 preferably has a plurality of sleeve sections 44 securing the filter elements 20 therein, as shown in FIGS. 10 and 11. The sleeves 44 are preferably formed of a polypropylene material. The sleeve sections 44 are preferably between about one and about two inches in length, as measured along the longitudinal axis of the filter module 10. While it is preferable to use multiple sleeve sections 44 on each bundle 22 in the filter module 10, those of skill in the art will appreciate from this disclosure that the sleeve sections 44 can be used on only one of the bundles 22, on a few of the bundles 22, or not used on any of the bundles 22 in the filter module 10. While it is preferable to form the sleeve sections 44 out of a polypropylene material, it is understood by those of skill in the art from this disclosure that various materials exhibiting suitable anti-abrasion properties (thus protecting the fibers 20 and nettings 40, 42 from damage from a sleeve section 44) can be used without departing from the scope of the present invention.

Referring to FIG. 11, a substantial number of the filter elements 20 in each bundle 22 is deformed to have a bowed-shape 46. The bowed-shape 46 filter elements 20 form spaces in the bundles 22 due to the deformation of a substantial number of the fibers 20. By using a bundle 22 having fibers 20 that exhibit the bowed-shape 46, the increased amount of space between the fibers 20 simplifies the flow of filtered water from an individual fiber element to the hollow tube 12 by simplifying the flow of filtered water through the bundle. The improved flow of filtered liquid through the bundle also reduces the pressure loss over the length of the fiber 20 because the filtered liquid requires less pressure to flow from the bundle 22 into the hollow tube 12. This allows longitudinally longer filter modules 10 to be used without requiring an increased pressure differential across the filter module 10. Conversely, filter modules 10 using bundles 22 exhibiting the bowed-shape 46 along several longitudinal sections of the bundles 22 (hereinafter referred to as a "fluffed-up bundle"), require a reduced pressure differential between the raw liquid intake 48 and the raw liquid outlet 50 relative to filter modules using non-fluffed-up bundles of similar length, thus reducing the operating costs of filter modules 10 of the present invention relative to the cost of similarly sized conventional filter modules.

A plurality of fins 26 are disposed among the hollow fiber filter elements to separate the elements into a plurality of bundles 22. Referring to FIG. 4, the fins 26 extend radially outwardly from the hollow tube 12 toward the outer housing 32. As partially shown in FIG. 2, the fins 26 have a generally rectangular shape. Each of the fins 26 has a plurality of spacers 28 abutting the hollow tube 12 to form liquid pathways 30 between each of the respective fins 26 and the hollow tube 12. The spacers 28 serve to hold the fins 26 in place on the hollow tube 12 and are preferably rectangularly shaped and protrude slightly from an interior edge of the fin 26 to abut the outer surface of the hollow tube 12. While it is preferable that the spacers 28 have a generally rectangular shape, those of skill in the art will appreciate from this disclosure that any shape may be used for the spacer 28 without departing from the scope of the present invention. The important aspect of the spacers 28 is that the spacers 28 create liquid pathways 30 between the fins 26 and the hollow tube 12.

These liquid pathways 30 result in better filtered liquid flow within the filter module 10. Thus, the improved liquid flow increases the efficiency of the overall filter module 10. While the spacers 28 are preferably integrally formed with the fin 26, those of skill in the art will appreciate from this disclosure that the spacers 28 can be separately manufactured and attached to the fin 26 using a snap fit or interlocking connection as is understood by those of skill in the art when considered in combination with this disclosure.

Each of the spacers 28 has a prong 38 extending therefrom. The prong 38 engages one of the perforations 14 while not fully obstructing the engaged perforation 14. The prongs 38 preferably have a comparable thickness to that of the separator fin 26 and are integrally formed with the spacers 28. By only occupying a portion of the engaged perforation 14, the prongs 38 minimize the obstruction of the filtered liquid flow into the hollow tube 12. Thus, the overall efficiency of the filter module 10 is increased. Referring to FIGS. 4 and 6, the prongs 38 preferably extend through the hollow tube 12 and protrude slightly inside of the hollow tube 12.

Referring to FIGS. 1–11, the filter module of the present invention operates as follows. The filter module, 10 is attached to a suitable filtration system with a raw liquid supply being attached to the sideport adaptor 78 forming the raw liquid inlet end 48. A concentrated raw liquid receiving portion of the filtration system is attached to the sideport adaptor 78 forming the raw liquid outlet end 50 of the filter module 10. Then, the portion of the filtration system that handles the filtered liquid is attached to the product end adaptor 62 of the outer housing 32 which forms the filtered liquid outlet 52 of the filter module 10.

Then, raw liquid is pumped from the raw liquid inlet 48 to the raw liquid outlet 50 using an appropriate pressure differential between the two sideport adaptors 78. Referring to FIG. 2, the raw liquid entering through the raw liquid inlet 48 enters into the second chamber 80B which circumferentially surrounds the core tube plug 56. The core tube plug 56 and associated seals prevent the raw liquid from entering the hollow tube 12. Additionally, the second non-porous layer 16B prevents the raw liquid from leaving the second chamber 80B except by entering the channels that are formed by the fibers 20. Thus, raw liquid is forced into the end of the fibers 20.

As the raw liquid traverses the length of the fibers 20 portions of the liquid pass through the circumferential wall of the fibers 20. Due to the properties of the fibers 20, the raw liquid that passes through the surface of the fibers 20 is filtered to form a filtered liquid. The filtered liquid travels out of the bundle that contains the associated fibers 20 and travels along a fin 26 toward the hollow tube 12.

The liquid pathways 30 between the fins 26 and the hollow tube 12 enhance the flow of the filtered liquid which then passes through the perforated holes 14 into the hollow tube 12. The remaining raw liquid inside of the fibers 20 is ejected into the first chamber 80A and then removed from the filter module 10 via the side port adaptor 78 which forms the raw liquid outlet 50. The filtered liquid in the hollow tube 12 is removed from the filter module 10 via the product end adaptor 62 that forms the filtered liquid outlet 52. As detailed above, any one or all of the bundles 22 may be of the fluffed-up type which simplifies the transport of the filtered water through the hollow tube 12 and thus reduces the overall pressure differential that is necessary to operate the filter module 10.

Referring to FIGS. 8–11, a method of manufacturing a filter module 10 according to the present invention is illustrated in which a plurality of hollow fibers 20 are arranged in a plurality of bundles 22 that are secured in an outer housing 32 are first "fluffed-up" to increase the spacing of the fibers in the bundle. The method comprises the following steps.

The first step is securing a first end 84A of a bundle 22 having a longitudinal axis using any suitable means, such as holding or clamping. Then, the next step involves securing a second end 84B of the bundle 22 and rotating the second end of the bundle 22 in a first direction about the longitudinal axis to twist the bundle 22 and stretch the fibers 20, as shown in FIG. 9. It is preferable that the second end 84B of the bundle 22 is rotated through between about one to about ten revolutions, more preferably between about two to five revolutions, during the step of rotating the second end 84B of the bundle 22 in the first direction.

While specific preferred ranges have been detailed for rotating the second end of the bundle in a first direction, it is understood by those of skill in the art from this disclosure that different amounts of rotation can be used by rotating the second end 84B of the bundle 22 through an amount depending upon the length of the filter module 10 and the specific materials used to construct the fibers 20. For instance, a bundle 22 may be rotated through only one eighth of a rotation in a first direction.

Then, during the next step, a plurality of sleeve segments 44 are slid over the twisted bundle 22 to fix the position of portions of the fibers 20 at predetermined points along the length of the bundle, as shown in FIGS. 10 and 11. Afterwards, the second end 84B of the bundle 22 is rotated in a second direction, opposite in direction to the first direction, to generate a plurality of outward bows of the fibers from the longitudinal axis of the bundle, thus creating spaces between the fibers within the bundle. This twisting and untwisting of the bundle 22 results in the fluffed-up bundle 22 having a bowed shape and having an increased amount of space between the plurality of fibers 20 in the fluffed-up bundle 22.

Then, the fluffed-up bundle 22, as shown in FIG. 11, is installed within the outer housing 32 while maintaining the outward bow 46 of the plurality of fibers 20 in the bundle 22. As mentioned above, the fluffed-up bundle 22 is capable of filtering raw liquid using a reduced pressure differential across the bundle 22 relative to that of a similarly sized non-fluffed up bundle 22.

The filter module of the present invention improves the flow of filtered liquid through the filter module 10 to enhance the overall performance of the filter module 10. The improved flow of filtered liquid enhances the performance of the filter module 10 and thereby reduces the associated costs of replacing or maintaining filter modules of the present invention.

It is recognized by those skilled in the art, that changes may be made to the above-described embodiments of the invention without departing from the broad inventive concept thereof. It is understood, therefore, that this invention is not limited to the particular embodiments disclosed, but is intended to cover all modifications which are within the spirit and scope of the invention as defined by the appended claims.

What is claimed is:

1. In a method of manufacturing a filter module of the type in which a plurality of hollow fibers are arranged in a plurality of bundles secured in an outer housing for filtering a raw liquid through a circumferential surface of the plurality of fibers and an interior hollow perforated tube is provided in the housing for guiding filtered liquid out of the module, wherein the improvement comprises the following steps:

securing a first end of a bundle having a longitudinal axis;

securing a second end of the bundle;

rotating the second end of the bundle in a first direction about the longitudinal axis to twist the bundle and stretch the fibers;

sliding a plurality of sleeve segments over the twisted bundle to fix the position of portions of the fibers at predetermined points along a length of the bundle;

rotating the second end of the bundle in a second direction, opposite in direction to the first direction, to generate a plurality of outward bows of the fibers from the longitudinal axis of the bundle, thus creating spaces between the fibers in the bundle; and installing the bundle within the outer housing.

2. The method of claim 1, wherein the second end is rotated through between one to ten revolutions during the step of rotating the second end of the bundle in the first direction.

3. The method of claim 1, wherein the second end is rotated through between two to five revolutions during the step of rotating the second end of the bundle in the first direction.

* * * * *